US009179012B2

(12) United States Patent
Kawai

(10) Patent No.: US 9,179,012 B2
(45) Date of Patent: Nov. 3, 2015

(54) IMAGE READING APPARATUS, IMAGE FORMING APPARATUS, IMAGE READING METHOD AND RECORDING MEDIUM THAT ENSURE SIMPLIFIED DETECTION OF NOISE MIXED IN IMAGE SIGNAL

(71) Applicant: KYOCERA Document Solutions Inc., Osaka (JP)

(72) Inventor: Hisaji Kawai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/581,377

(22) Filed: Dec. 23, 2014

(65) Prior Publication Data

US 2015/0189104 A1    Jul. 2, 2015

(30) Foreign Application Priority Data

Dec. 26, 2013    (JP) .................................. 2013-268585

(51) Int. Cl.
*H04N 1/04* (2006.01)
*H04N 1/00* (2006.01)

(52) U.S. Cl.
CPC ....... *H04N 1/00005* (2013.01); *H04N 1/00013* (2013.01); *H04N 1/00037* (2013.01); *H04N 1/00082* (2013.01)

(58) Field of Classification Search
CPC .................. H04N 1/4097; H04N 2201/04768; H04N 5/357; H04N 2201/0081; G06K 15/1219; G06K 15/129; G06K 2209/01; G06K 9/346

USPC ......... 358/463, 474, 514, 3.26, 1.9, 448, 504, 358/494, 1.5, 475, 509, 518; 382/275, 254, 382/167, 274; 348/E5.085, E5.086, 607
See application file for complete search history.

(56) References Cited

U.S. PATENT DOCUMENTS

| | | | | |
|---|---|---|---|---|
| 5,756,981 | A * | 5/1998 | Roustaei et al. | 235/462.42 |
| 6,494,300 | B1 * | 12/2002 | Ferlicca | 188/129 |
| 6,666,824 | B2 * | 12/2003 | Rust et al. | 600/443 |
| 7,511,769 | B2 * | 3/2009 | Renner et al. | 348/627 |
| 7,948,015 | B2 * | 5/2011 | Rothberg et al. | 257/253 |
| 8,111,308 | B2 * | 2/2012 | Suwa | 348/248 |
| 8,248,491 | B2 * | 8/2012 | On | 348/241 |

(Continued)

FOREIGN PATENT DOCUMENTS

| | | | |
|---|---|---|---|
| JP | 2000-310820 A | 11/2000 | |
| JP | 2005-51295 A | 2/2005 | |
| JP | 2005-210559 A | 8/2005 | |

*Primary Examiner* — Negussie Worku
(74) *Attorney, Agent, or Firm* — Stein IP, LLC

(57) ABSTRACT

An image reading apparatus includes an imaging unit and a noise detecting unit. The imaging unit includes a valid pixel group constituted of imaging elements arranged in one row in a main-scanning direction valid for reading a document image and dummy pixel groups constituted of imaging elements arranged on both sides of the valid pixel group invalid for reading the document image. The imaging unit reads each line of the document image while moving relatively to a sub-scanning direction. The noise detecting unit detects a noise mixing into the line read by the imaging unit based on an image signal captured by the dummy pixel group. The dummy pixel group receives a predetermined luminescence level of light. The noise detecting unit detects the noise mixing into the line when a pixel value output from the dummy pixel group varies to exceed a predetermined value.

5 Claims, 4 Drawing Sheets

(56) References Cited

U.S. PATENT DOCUMENTS

| | | | |
|---|---|---|---|
| 8,262,900 B2* | 9/2012 | Rothberg et al. | 205/793.5 |
| 8,810,861 B2* | 8/2014 | Yamakawa | 358/3.26 |
| 8,976,414 B2* | 3/2015 | Ohira | 358/1.9 |
| 2005/0140795 A1* | 6/2005 | Hisamatsu et al. | 348/222.1 |
| 2005/0185224 A1 | 8/2005 | Yoshizawa | 358/3.26 |
| 2006/0066921 A1* | 3/2006 | Saka et al. | 358/474 |
| 2007/0097443 A1* | 5/2007 | Ishiguro et al. | 358/3.26 |
| 2010/0053383 A1* | 3/2010 | Ichikawa | 348/247 |
| 2011/0019039 A1* | 1/2011 | Ikuma et al. | 348/246 |
| 2011/0025874 A1* | 2/2011 | Tamaoki | 348/222.1 |
| 2012/0293843 A1* | 11/2012 | Yamakawa | 358/448 |

\* cited by examiner

IMAGE READING APPARATUS, IMAGE FORMING APPARATUS, IMAGE READING METHOD AND RECORDING MEDIUM THAT ENSURE SIMPLIFIED DETECTION OF NOISE MIXED IN IMAGE SIGNAL

INCORPORATION BY REFERENCE

This application is based upon, and claims the benefit of priority from, corresponding Japanese Patent Application No. 2013-268585 filed in the Japan Patent Office on Dec. 26, 2013, the entire contents of which are incorporated herein by reference.

BACKGROUND

Unless otherwise indicated herein, the description in this section is not prior art to the claims in this application and is not admitted to be prior art by inclusion in this section.

A copying machine, a facsimile, a scanner or a similar device is an image reading apparatus that reads a document image with a line sensor. Typically, the line sensor includes imaging elements installed in one row in a main-scanning direction. After placing a document on an exposure glass, the line sensor moves in a sub-scanning direction to read an image. However, reading the document image while a foreign object such as dust adheres to the exposure glass causes its foreign object to be contained and read as the image. Therefore, one technique detects presence of the foreign object by which an imaging member reads a margin of the document and detects abnormalities in an image data.

There is a method for detecting the presence of the foreign object by a compared difference between white reference surface data which an imaging apparatus acquires by reading a white reference surface and the white reference data which is pre-stored in a non-volatile memory.

Another technique detects a noise line on the image, which the image data shows, in a short time from the start of document reading and performing a removal correction.

SUMMARY

An image reading apparatus according to an aspect of the disclosure includes an imaging unit and a noise detecting unit. The imaging unit includes a valid pixel group constituted of imaging elements arranged in one row in a main-scanning direction valid for reading a document image and dummy pixel groups constituted of imaging elements arranged on both sides of the valid pixel group invalid for reading the document image. The imaging unit reads each line of the document image while moving relatively to a sub-scanning direction. The noise detecting unit detects a noise mixing into the line read by the imaging unit based on an image signal captured by the dummy pixel group. The dummy pixel group receives a predetermined luminescence level of light. The noise detecting unit detects the noise mixing into the line when a pixel value output from the dummy pixel group varies to exceed a predetermined value.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
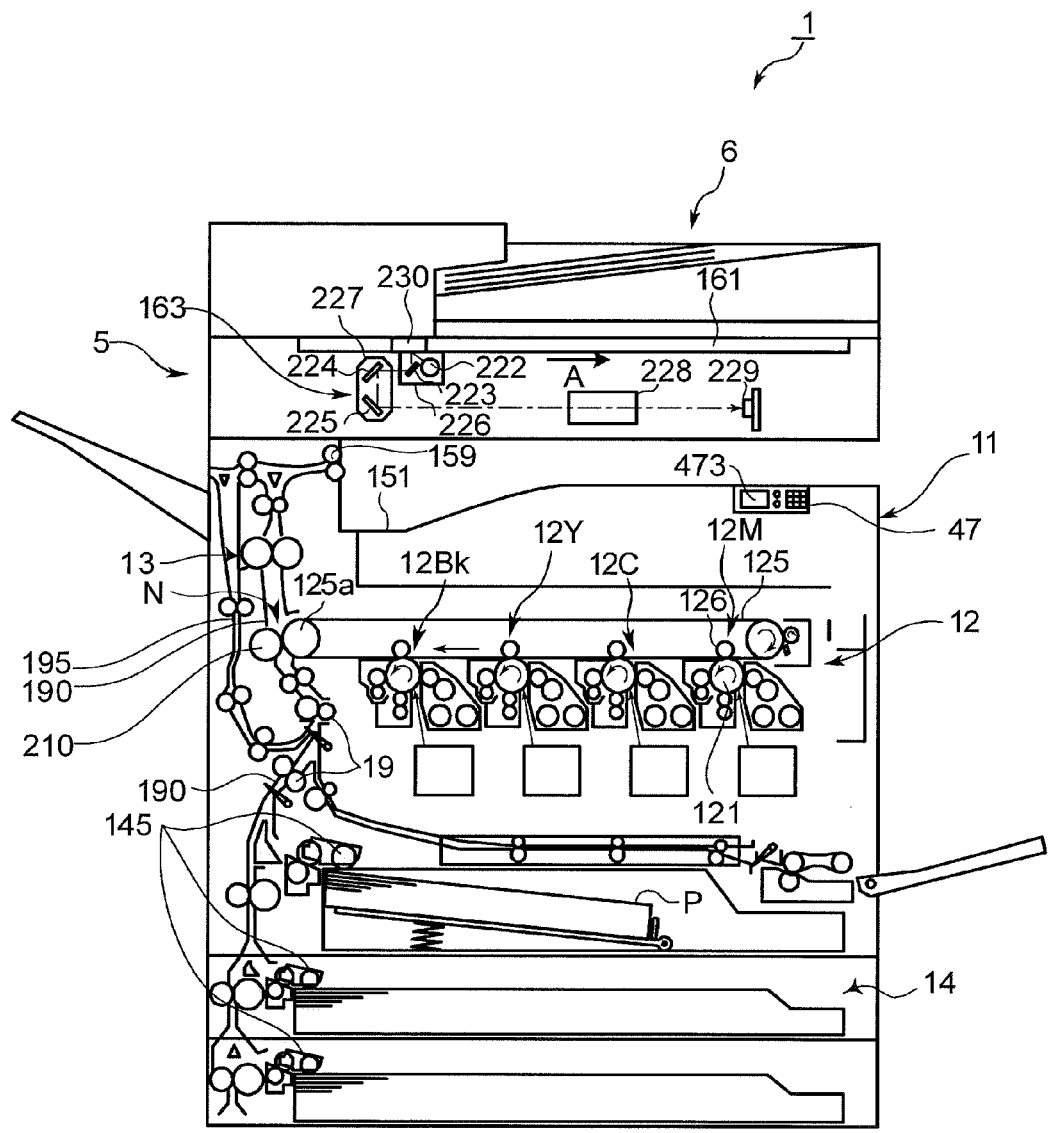
FIG. 1 illustrates a cross section of a front side of an image forming apparatus.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An image reading apparatus and an image forming apparatus according to one embodiment of the disclosure will now be described with reference to the attached drawings. FIG. 1 illustrates a cross section of a front side of a schematic configuration of the image forming apparatus including the image reading apparatus according to one embodiment of the disclosure. In the embodiment, the description will be given of the image forming apparatus as an example. However, any image reading apparatus equipped with only a scanner function may be employed. Additionally, in the embodiment, the description will be given of a color image forming apparatus as the example. However, a monochrome image forming apparatus may be applicable.

An image forming apparatus 1 includes an operation unit 47, an image forming unit 12, a fixing unit 13, a paper sheet feeder 14, a document feeding unit 6, and an image reading unit 5, or a similar unit in an apparatus main body 11.

The operation unit 47 accepts instructions such as execution instructions of an image forming operation and a document reading operation from an operator on various operations and processes executable by the image forming apparatus 1. The operation unit 47 includes a display unit 473 which displays such as operation guidance for the operator.

The image reading unit 5 optically acquires a document image to generate an image data. The image reading unit 5 includes a platen glass 161, a light source 222, a first mirror 223, a second mirror 224, a third mirror 225, a first carriage 226, a second carriage 227, an image formation lens 228, and a line sensor 229 (imaging unit).

The platen glass 161 is a portion where a document is placed on. The light source 222 and the first mirror 223 are supported by the first carriage 226. The second mirror 224 and the third mirror 225 are supported by the second carriage 227.

The line sensor 229 includes a plurality of Charge Coupled Devices (CCD; imaging unit) that are arranged in one row in a main-scanning direction. The line sensor 229 may employ a Complementary Metal Oxide Semiconductor (CMOS) image sensor.

A document reading method of the image reading unit 5 includes a flatbed reading mode, which the image reading unit 5 reads the document placed on the platen glass 161, and an Auto Document Feeder (ADF) reading mode, which the image reading unit 5 reads the document along the way while the document feeding unit 6 feeds it.

For the flatbed reading mode, the light source 222 irradiates the document placed on the platen glass 161. A reflected light per one line in the main-scanning direction is reflected off the first mirror 223, the second mirror 224, and the third mirror 225 successively in order to enter the image formation lens 228. The light entering the image formation lens 228 is formed the image on a light receiving surface of the line sensor 229. The line sensor 229 is a linear image sensor and processes the document image per one line simultaneously. Upon completion of a reading per one line, the first carriage 226 and the second carriage 227 move in a direction perpendicular to the main-scanning direction (sub-scanning direction, an arrow A direction). Subsequently, reading the following line is performed.

For the ADF reading mode, when the document fed by the document feeding unit 6 passes on a reading window 230, the light source 222 irradiates the document. Subsequently, the reflected light per one line in the main-scanning direction is reflected off the first mirror 223, the second mirror 224, and the third mirror 225 successively in order to enter the image formation lens 228. The light entering the image formation lens 228 is formed the image on the light receiving surface of the line sensor 229. And then, the document is conveyed by the document feeding unit 6 followed by reading the following line.

When the image forming apparatus 1 performs the image forming operation, the image forming unit 12 forms a toner image on a recording sheet as a recording medium to be fed from the paper sheet feeder 14 based on the image data generated by the document reading operation. For color printing, the image forming unit 12M for magenta, the image forming unit 12C for cyan, the image forming unit 12Y for yellow, and the image forming unit 12Bk for black of the image forming unit 12 each form the toner image on a photoreceptor drum 121 based on images formed of the respective color components constituting the image data through processes of charge, exposure, and development. And then, a primary transfer roller 126 causes the toner images to be transferred on an intermediate transfer belt 125.

The toner images with the respective colors to be transferred on the intermediate transfer belt 125 are superimposed on the intermediate transfer belt 125 while the transfer timing is adjusted, thus forming a color toner image. A secondary transfer roller 210 causes the color toner image formed on the surface of the intermediate transfer belt 125 to be transferred on the recording sheet conveyed from the paper sheet feeder 14 to a conveyance path 190 at a nip portion N between the secondary transfer roller 210 and the drive roller 125a, which sandwiches the intermediate transfer belt 125. Thereafter, the fixing unit 13 causes the toner image on the recording sheet to be fixed on the recording sheet by thermocompression bonding. The color-image-formed recording sheet on which the fixing process has been completed is discharged to a discharge tray 151.

The paper sheet feeder 14 includes a plurality of sheet feed cassettes. A control unit (described below) rotatably drives a pickup roller 145 of the sheet feed cassette, which houses the recording sheet having the size specified by the operator's instruction, to convey the recording sheet housed in each sheet feed cassette to the nip portion N.

For duplex printing, the image forming apparatus 1 performs the following processes. The image forming apparatus 1 provides a state where the recording sheet, of which the image forming unit 12 forms the image on one side, is nipped by a discharge roller pair 159. And then, the image forming apparatus 1 reversely feeds the recording sheet with the discharge roller pair 159 to transfer it to an inverting conveyance path 195. Subsequently, the image forming apparatus 1 reconveys the recording sheet with a conveyance roller pair 19 in the upper stream of a conveyance direction of the recording sheet with respect to the nip portion N and the fixing unit 13. As a result, the image is formed on the other side of the recording sheet by the image forming unit 12.

Figure 2:
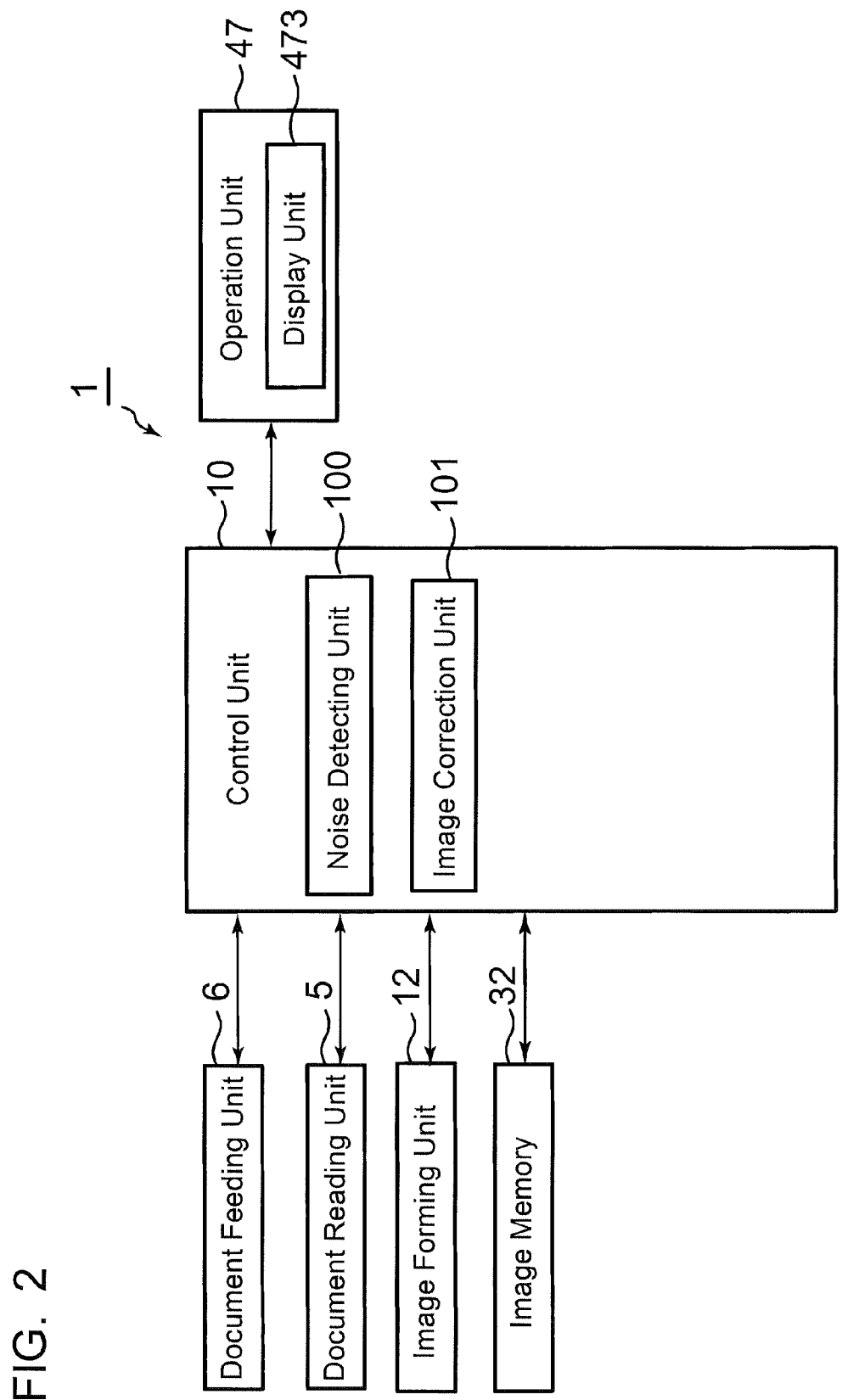
FIG. 2 illustrates a main internal constitution of the image forming apparatus.

FIG. 2 illustrates a function block of a main internal constitution of the image forming apparatus 1. The image forming apparatus 1 includes a control unit 10, the operation unit 47, the document feeding unit 6, the image reading unit 5, the image forming unit 12, an image memory, or a similar unit. The description of components described with reference to FIG. 1 will be omitted.

An image memory 32 is an area where the image data of the document read by the image reading unit 5 is temporarily stored or where data to be printed of the image forming unit 12 is temporarily saved.

The control unit 10 is mainly constituted of a Central Processing Unit (CPU), a RAM, a ROM, and a dedicated hardware circuit. The control unit 10 manages overall operation control of the image forming apparatus 1 by executing predetermined programs. The predetermined programs are stored in a non-transitory computer-readable recording medium. The control unit 10 includes a noise detecting unit 100 and an image correction unit 101.

The noise detecting unit 100 detects a noise mixing in the image data per one line read by the line sensor 229.

Figure 3:
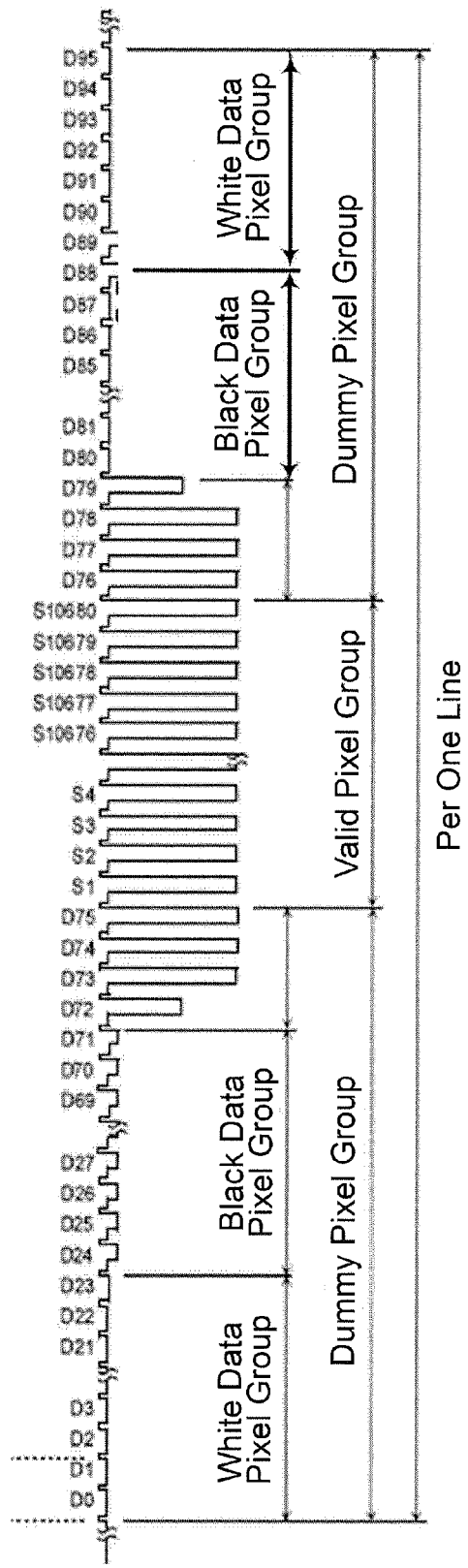
FIG. 3 illustrates a line sensor.

A detailed description will be given of this noise detecting. FIG. 3 illustrates the line sensor 229. In FIG. 3, reference designator S1 to S10680 denotes a valid pixel group that is valid for reading the document image. Reference designators D0 to D75 and D76 to D95 denote dummy pixel groups that are invalid for reading the document image. The line sensor 229 includes the dummy pixel group of D0 to D75, the valid pixel group of S1 to S10680, and the dummy pixel group of D76 to D95. These respective pixel groups are provided to be arranged in one row. For example, a pixel area of the line sensor 229 is assigned to the above-described valid pixel group and dummy pixel group.

An image signal read by the valid pixel group of S1 to S10680 is used as the image data. The dummy pixel groups of D0 to D75 and D76 to D95 are each arranged on both sides of the valid pixel group. The image signal read by these pixel groups is not used as the image data.

The dummy pixel groups are classified as a white data pixel group (D0 to D23 and D89 to D95 such as illustrated in FIG. 3) and a black data pixel group (D24 to D71 and D80 to D88 such as illustrated in FIG. 3). The white data pixel group constantly receives light at a predetermined luminescence level irradiate by the light source 222. Therefore, the white data pixel group continuously output the image signal at a constant output.

The black data pixel group of the line sensor 229 is covered with shielding material so as to prevent from receiving light. One example of a shielding method is provided to shield by sticking the light receiving surface of the CCD, which belongs to the black data pixel group, on with such as black color tape. Therefore, the black data pixel group constantly output the image signal having such as a pixel value of 0 which indicates a black color.

Meanwhile, if noise due to such as static electricity comes in the line sensor 229 and a data line connected with the line sensor 229, the image signal may vary. Then, the value of the image signal output from the white data pixel group or the black data pixel group is more likely to vary as well. Accordingly, when the image signal, which is output from at least one of the white data pixel group and the black data pixel group, varies to exceed a predetermined value, the noise detecting unit 100 determines occurrence of noise. This predetermined value may be set to be identical or individually different regarding the white data pixel group and the black data pixel group.

When the noise detecting unit 100 detects the noise mixing, the image correction unit 101 corrects the image signal of the line having the noise mixing with using the preceding and following lines. A correction method includes that such as an average value of the image signals of the respective pixels, which constitutes the preceding and following lines, may be the image signal of this line having the noise mixing.

Figure 4:
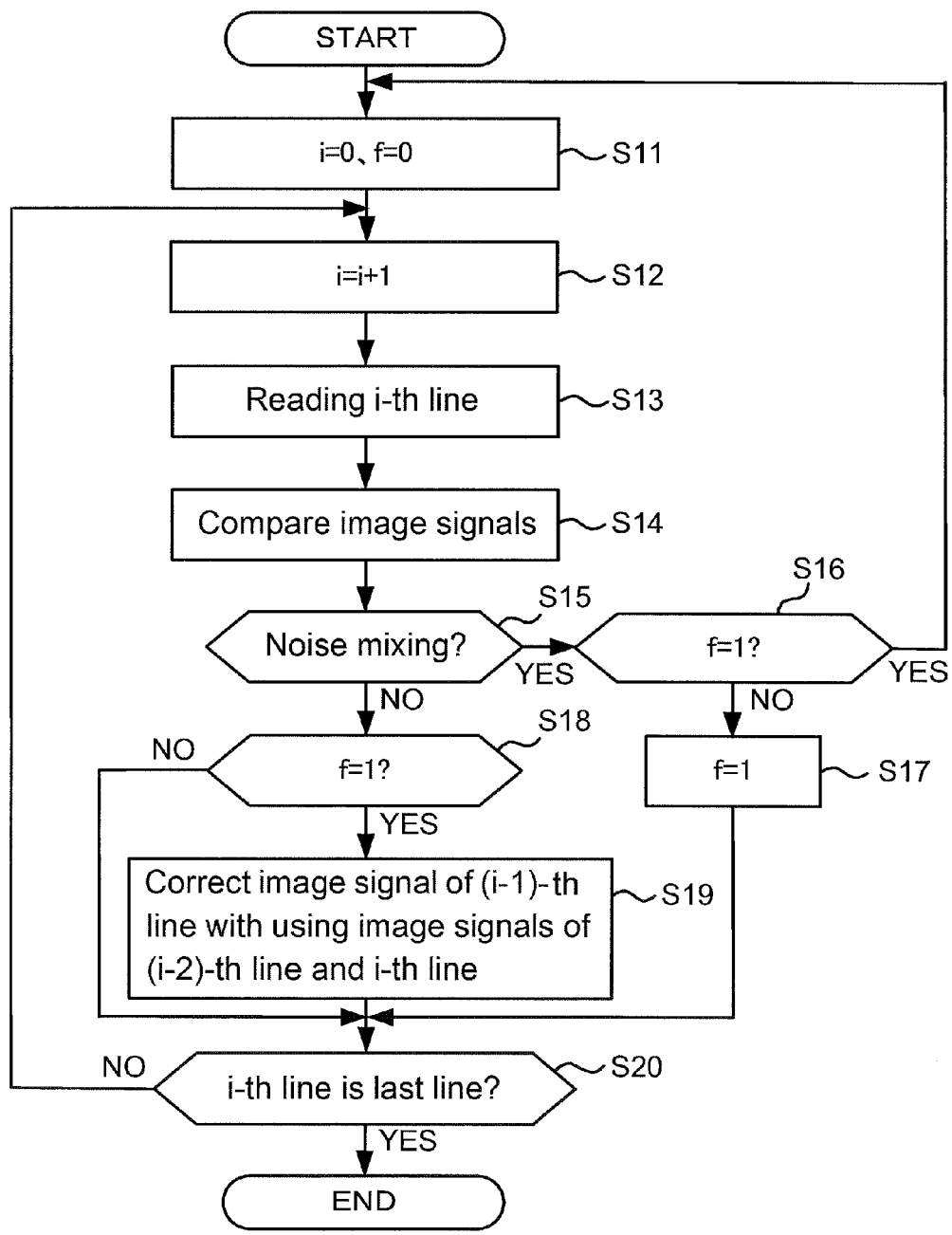
FIG. 4 illustrates a flow of an image reading process.

FIG. 4 is a flowchart illustrating a flow of an image reading process. First, the control unit 10 set variables i and f, and assigns a value of 0 to the respective variables (step S11). The variable i indicates a number of a reading line. The variable f is a flag variable that indicates whether the noise has been mixed in the preceding line or not.

Next, the control unit 10 adds the value of 1 to the variable i (step S12). The control unit 10 makes the image reading unit 5 perform reading of the i-th line (step S13). Subsequently, the noise detecting unit 100 validates the image signal output from the white data pixel group and the black data pixel group (step S14). For example, assuming that the CCD of the white data pixel group constantly outputs the image signal having the pixel value of 255 (in the case of 8 bit) by constantly receiving the light at the predetermined luminescence level. Meanwhile, when the pixel value becomes equal to or less than a predetermined white data reference value (such as the value of 230), the noise detecting unit 100 determines that the line to be read has the noise mixing.

The CCD of the black data pixel group constantly outputs the image signal having the pixel value of 0 by cutting off the entering light. Meanwhile, when the pixel value becomes equal to or more than a predetermined black data reference value (such as the value of 20), the noise detecting unit 100 determines that the line to be read has the noise mixing.

When any one of the CCDs belonging to the white data pixel group outputs an image signal that is equal to or less than the white data reference value, and when any one of the CCDs belonging to the black data pixel group outputs the image signal that is equal to or more than the black data reference value, the noise detecting unit 100 determines the noise mixing. Additionally, when the image signal which is out of the reference range is output from one of the white data pixel group and the black data pixel group, the noise detecting unit 100 determines that the line has the noise mixing.

When the noise has been mixed (step S15; YES), the control unit 10 determines whether the variable f is the value of 1 or not (step S16). When the variable f is the value of 1, this indicates that the preceding line (the (i−1)-th line) also has the noise mixing. When the variable f is the value of 1 (step S16; YES), the control unit 10 causes a process to proceed to step S11 because the two consecutive lines each has the noise mixing. When the line having the noise mixing appears in two consecutive lines, this results in difficulty in an image correction for the line having the noise mixing. Furthermore, this causes an image disturbance. Therefore, the control unit 10 makes the image reading unit 5 perform reading of the document image from scratch.

When the variable f is not the value of 1 (step S16; NO), the control unit 10 assigns the value of 1 to the variable f (step S17) to cause the process to proceed to step S20.

Now returning to step S15. When the noise has not been mixed in the i-th line (step S15; NO), the control unit 10 determines whether the variable f is the value of 1 or not (step S18). When the variable f is the value of 1, this indicates that the preceding line (the (i−1)-th line) has the noise mixing. Therefore, the image correction unit 101 performs the image correction for the preceding line (step S19). For example, the image correction for the (i−1)-th line is performed with using the image signals of the (i−2)-th line and the i-th line. Then, the control unit 10 assigns the value of 0 to the variable f.

When the noise mixing is detected in the first line (i=1) as described above, the above-described image correction for the first line (i=1) may be performed with using the image signal of the only line in the second row (i=2), or with using the image signals of the lines in the second row (i=2) and the third row (i=3).

When the noise mixing is detected in the last line as described above, the above-described image correction for the last line may be performed with using the image signal of the immediately preceding only one line of this last line, or with using the image signals of the immediately preceding two lines of this last line.

In step S18, when the variable f is not the value of 1 (step S18; NO), the control unit 10 causes the process to proceed to step S20.

In step S20, the control unit 10 determines whether the i-th line is the last line for the image reading or not. When the i-th line is not the last line (step S20; NO), the control unit 10 causes the process to proceed to step S12. When the i-th line is the last line (step S20; YES), the control unit 10 terminates the process.

As stated previously, the image signal is output from the white data pixel group and the black data pixel group included in the dummy pixel group which is invalid for reading the document image. The noise detecting unit 100 detects the variation of the image signal. This ensures that the noise mixing in the image signal can be easily detected. Furthermore, the image correction unit 101 corrects the image signal of the line having the noise mixing with using the image signal of the preceding and following lines. Accordingly, the stripe-shaped image disturbance in the main-scanning direction to the line having the noise mixing can be prevented.

When the line having the noise mixing consecutively appears, rereading the document image can prevent an image deterioration.

According to the embodiment described above, when the noise detecting unit 100 detects the line having the noise mixing which is inconsecutive and settles in one line, the image correction unit 101 performs the image correction for this line having the noise mixing. However, the number of line, which is a reference for determining whether this image correction is required or not, is not limited to this one line, and my also include the predetermined any other value of 2 or more. When the noise detecting unit 100 detects two consecutive lines having the noise mixing, the control unit 10 makes the image reading unit 5 reread the image to be read of this line. However, the number of line, which is the reference for determining whether this rereading is required or not, is not limited to this two lines, and my also include the predetermined any other value. Note that the number of line which is the reference for determining whether this rereading is required or not, is the serial value in the number of line which is the reference for determining whether the above-described image correction is required or not, and preferably is the larger value than the number of line which is the reference for determining whether the above-described image correction is required or not.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus, comprising:
    an imaging unit that includes a valid pixel group constituted of imaging elements arranged in one row in a main-scanning direction being valid for reading a document image and dummy pixel groups constituted of imaging elements arranged on both sides of the valid pixel group being invalid for reading the document image, the imaging unit to read each line of the document image while moving relatively to a sub-scanning direction; and
    a noise detecting unit that detects a noise mixing into the line read by the imaging unit,
    wherein the dummy pixel group has a white data pixel group that outputs white data and a black data pixel group that outputs black data, and
    the noise detecting unit detects the noise mixing into the line when a pixel value output from the black data pixel group becomes equal to or more than a predetermined black data reference value and/or a pixel value output from the white data pixel group becomes equal to or less than a predetermined white data reference value.

2. The image reading apparatus according to claim 1, wherein
    the image reading apparatus further includes a light source that irradiates the white data pixel group with light at a predetermined luminescence level, and
    the black data pixel group is covered with a shielding material that blocks incident light from the light source.

3. The image reading apparatus according to claim 1, further comprising
    an image correction unit that performs an image correction for the line where the noise mixing is detected,
    wherein the image correction unit corrects the line where the noise mixing is detected by adopting an average value of an image signal of a preceding line and of a following line as a value of the image signal of the line where the noise mixing is detected.

4. The image reading apparatus according to claim 1, further comprising
    a control unit that makes the imaging unit perform reading of the document image from scratch when the noise detecting unit detects the noise mixing consecutively for a predetermined number or more of lines for rereading.

5. An image forming apparatus, comprising:
    the image reading apparatus according to claim 1; and
    an image forming unit that prints an image on a paper sheet based on an image signal indicating the image read by the imaging unit.

* * * * *